US006675922B2

(12) United States Patent
Kawamoto et al.

(10) Patent No.: US 6,675,922 B2
(45) Date of Patent: Jan. 13, 2004

(54) WHEEL DRIVING SYSTEM FOR ALL-TERRAIN VEHICLE

(75) Inventors: Yuichi Kawamoto, Akashi (JP); Haruo Kitai, Akashi (JP); Izumi Takagi, Akashi (JP); Hiroyuki Fujimoto, Mitsu-Cho (JP)

(73) Assignee: Kawaski Jukogyo Kabushiki Kaisha, Kobe (JP)

( * ) Notice: Subject to any disclaimer, the term of this patent is extended or adjusted under 35 U.S.C. 154(b) by 26 days.

(21) Appl. No.: 10/000,950

(22) Filed: Dec. 4, 2001

(65) Prior Publication Data

US 2002/0066612 A1 Jun. 6, 2002

(30) Foreign Application Priority Data

Dec. 5, 2000 (JP) ........................................ 2000-369977

(51) Int. Cl.[7] .............................................. B60K 17/16
(52) U.S. Cl. ......................... 180/76; 475/239; 475/233
(58) Field of Search ................................. 180/250, 197, 180/76; 475/231, 237, 238, 239, 249, 250, 233; 192/93 A, 99 S

(56) References Cited

U.S. PATENT DOCUMENTS

| | | | | |
|---|---|---|---|---|
| 1,506,915 A | * | 9/1924 | Minthorn | 475/238 |
| 1,723,901 A | * | 8/1929 | Todd | 475/237 |
| 2,559,944 A | * | 7/1951 | Chapp | 475/238 |
| 3,306,130 A | * | 2/1967 | Salzmann | 475/237 |
| 4,876,921 A | * | 10/1989 | Yasui | 475/235 |
| 4,934,213 A | * | 6/1990 | Niizawa | 475/239 |
| 4,950,214 A | * | 8/1990 | Botterill | 475/231 |
| 5,092,825 A | * | 3/1992 | Goscenski | 475/231 |
| 5,520,589 A | * | 5/1996 | Dewald | 475/238 |

FOREIGN PATENT DOCUMENTS

| | | | | |
|---|---|---|---|---|
| GB | 908540 | * | 10/1962 | 475/237 |
| JP | A 59-20730 | | 2/1984 | |
| JP | 59-20730 | | 2/1984 | |
| JP | 61-180047 | * | 8/1986 | 475/237 |
| JP | 61-282645 | | 12/1986 | |
| JP | 63-009769 | | 1/1988 | |
| JP | 2-12549 | | 1/1990 | |
| JP | 3-4055 | | 1/1991 | |
| JP | 4-083945 | | 3/1992 | |

* cited by examiner

*Primary Examiner*—Daniel G. DePumpo
(74) *Attorney, Agent, or Firm*—Oliff & Berridge, PLC

(57) ABSTRACT

A wheel driving system is capable of varying differential limiting torque applied to a differential included in an all-terrain vehicle according to the difference between loads respectively applied to the right and the left wheel of the vehicle, which varies depending on the traveling condition or turning condition of the vehicle. Right and left wheels are connected through a differential gear mechanism (30) having a differential case (46) and held in a reduction gear case (13), an input pinion (22) and a drive shaft to an engine. The differential case (46) and a differential gear shaft (36) connected to the wheel are interlocked by a wet multiple-disk differential limiting mechanism (31) having a friction clutch mechanism immersed in oil. The multiple-disk differential limiting mechanism (31) is operated by a multiple-disk differential limiting mechanism operating mechanism to vary differential limiting torque. The torque transmitting capacity of the differential limiting mechanism (31) is adjusted by operating a turnable operating lever (21) disposed near a handgrip (15) attached to a handlebar included in the all-terrain vehicle.

8 Claims, 6 Drawing Sheets

WHEEL DRIVING SYSTEM FOR ALL-TERRAIN VEHICLE

BACKGROUND OF THE INVENTION

1. Field of the Invention

The present invention relates to a wheel driving system for an all-terrain vehicle provided with a differential gear mechanism formed in a reduction gear case and connecting the right and the left wheel of the vehicle to a drive shaft connected to an engine.

2. Description of the Related Art

A vehicle provided with a differential gear mechanism is provided with a differential locking device, i.e., one of differential limiting devices for limiting the differential motion of the differential. The differential locking device of a dog clutch system or a spline coupling system is capable of locking the differential. Such a differential locking device is disclosed in JP-A No. Sho 59-20730.

This known differential locking device is capable of operating only in an on-off mode either to fully lock the differential or to fully free the differential. Thus, the locking operation of the differential locking device locks the differential completely regardless of the difference between loads respectively applied to the right and the left wheel and is not capable of permitting the transmission of an optional torque. When locking the differential, the differential locking device takes time in engaging the dog clutch or the spline coupling.

Another differential limiting device produces a fixed differential limiting torque by using, for example, a coned disk spring. However, the differential limiting torque of this known differential limiting device is fixed and cannot be changed according to the traveling condition or turning condition of the vehicle while the vehicle is traveling.

SUMMARY OF THE INVENTION

Accordingly, it is an object of the present invention to provide a wheel driving system capable of varying differential limiting torque applied to a differential included in a vehicle according to the difference between loads respectively applied to the right and the left wheel of a vehicle, which varies depending on the traveling condition or turning condition of the vehicle, to improve the differential performance of the differential.

Another object of the present invention is to make it possible to arrange various mechanisms such as the differential gear mechanism, the multiple-disk differential limiting mechanism and the differential limiting mechanism operating mechanism within the reduction gear case compactly.

According to one aspect of the present invention, a wheel driving system for an all-terrain vehicle provided with a differential gear mechanism having a differential case and a driven gear fastened to the differential case, formed in a reduction gear case and connecting the right and left wheels of the vehicle to a drive shaft connected to an engine comprises a multiple-disk differential limiting mechanism capable of transmitting differential limiting torque and of varying the differential limiting torque, interposed between a first rotating member on the input side of the differential gear mechanism and a second rotating member on the side of the wheel, and a differential limiting mechanism operating mechanism for operating the differential limiting mechanism to vary the differential limiting torque. The differential limiting torque can be continuously and quickly varied while the vehicle is traveling, so that the differential performance of the differential and the operability of the vehicle are improved.

In this wheel driving system, the multiple-disk differential limiting mechanism may be of a wet type immersed in an oil. In the initial stage of a differential limiting operation, the viscosity of the oil filling up gaps between friction disks can be used to produce an initial differential limiting torque. Thus, an initial differential limiting torque can be simply determined.

The differential limiting mechanism operating mechanism of the wheel driving system may include a rotatable pressing cam ring disposed on one side of an arrangement of friction disks of the multiple-disk differential limiting mechanism and a cam mechanism capable of being made to compress the friction disks by a rotation of the pressing cam ring. Thus, the differential limiting mechanism operating mechanism can be compactly arranged in the reduction gear case.

In this wheel driving system, the differential limiting mechanism operating mechanism includes a turnable operating lever disposed near a handgrip put on a handlebar of the vehicle. The differential limiting torque of the differential limiting mechanism can be easily adjusted by operating the operating lever. The working differential limiting torque can be automatically changed to an initial differential limiting torque by releasing the operating lever.

In this wheel driving system, the driven gear (34) fastened to the differential case (46) is engaged with a drive pinion (33) and the drive pinion (33) is provided on an input shaft (22) of the differential gear mechanism (30), and wherein the multiple-disk differential limiting mechanism (31) is disposed opposite to the drive pinion (33) with respect to the driven gear (34). Thus, the components of various mechanisms such as the differential gear mechanism (30), the multiple-disk differential limiting mechanism (31) and the differential limiting mechanism operating mechanism (72, 77, . . . ) can be compactly arranged within the reduction gear case (13).

BRIEF DESCRIPTION OF THE DRAWINGS

The above and other objects, features and advantages of the present invention will become more apparent from the following description taken in connection with the accompanying drawings, in which.

DESCRIPTION OF THE PREFERRED EMBODIMENTS

Figure 1:
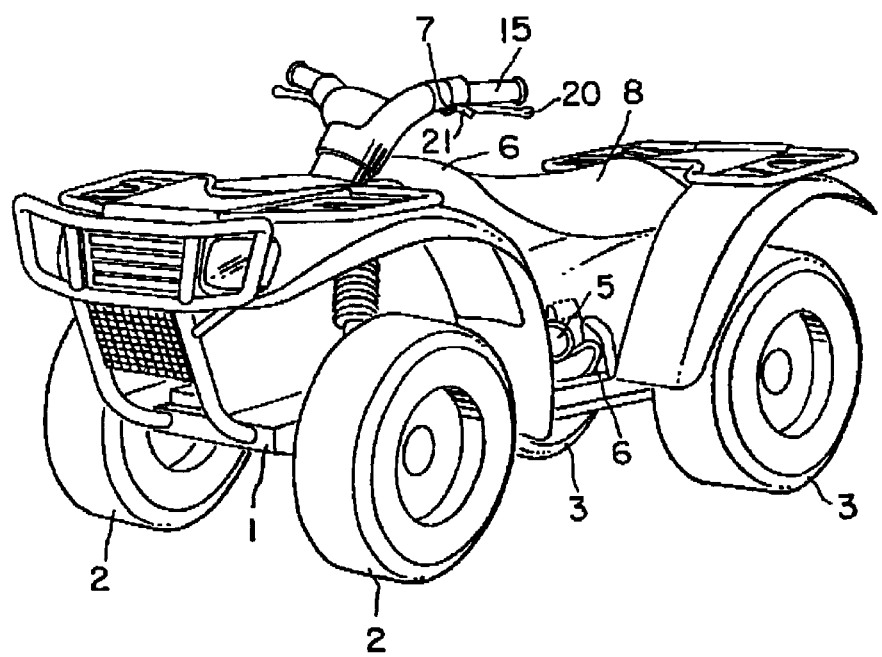
FIG. 1 is a perspective view of an all-terrain vehicle to which the present invention is applied.

Referring to FIG. 1 showing a straddle-type four-wheeled all-terrain vehicle to which the present invention is applied, right and left front wheels 2 are suspended from a front part of a body frame 1, and right and left rear wheels 3 are suspected from a rear part of the body frame 1. An engine 5 and a transmission case (crankcase) 6 are mounted on a middle part of the body frame 1. A handlebar 7 and a straddle-type seat 8 are disposed in an upper part of the vehicle. A handgrip 15 is put on one end part of the handlebar 7. Operating bars including a brake lever 20 and a differential limiting lever 21 are arranged near the grip 15.

Figure 2:
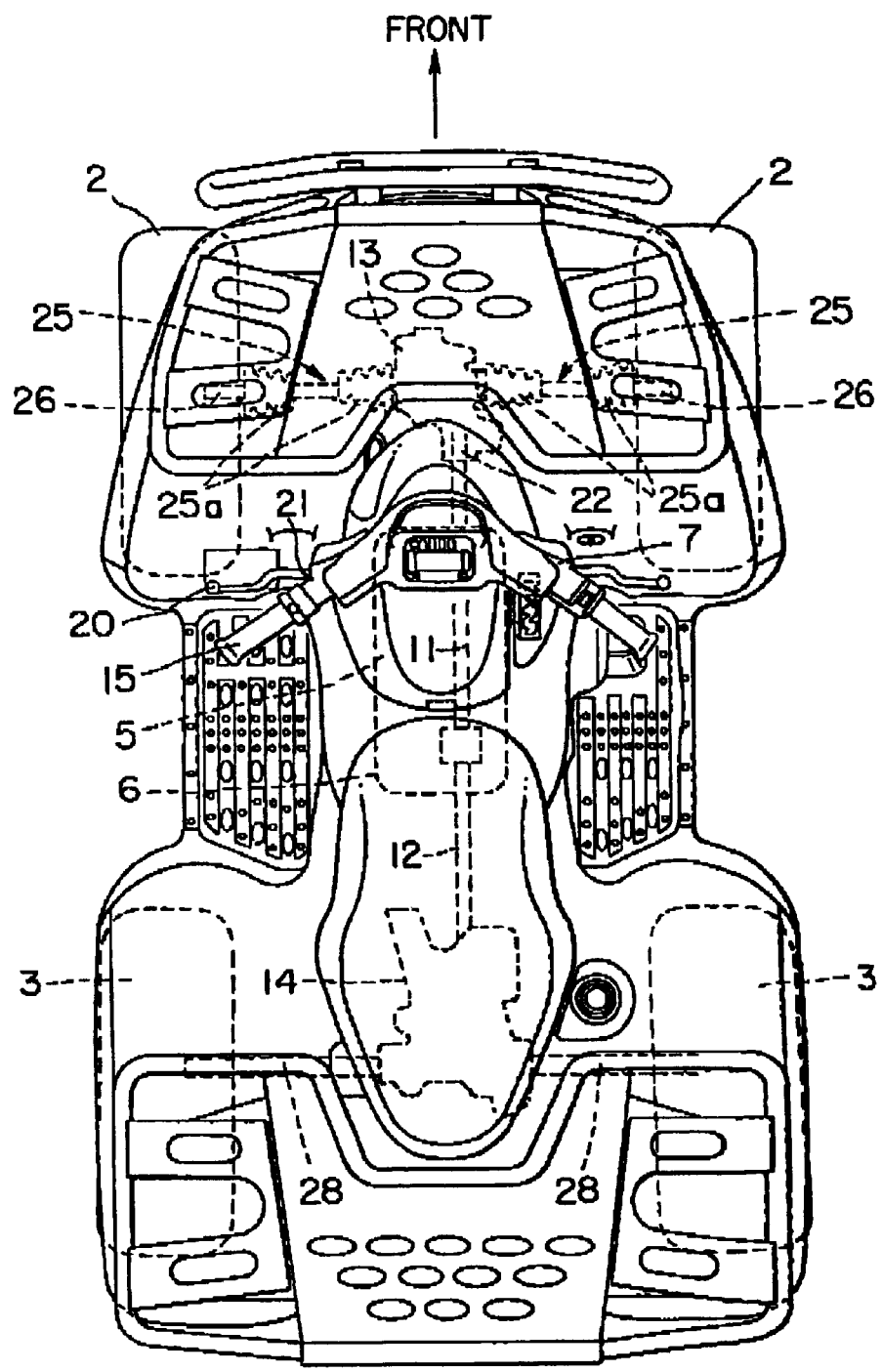
FIG. 2 is a plan view of the all-terrain vehicle shown in FIG. 1.

Referring to FIG. 2, a front propeller shaft 11 and a rear propeller shaft 12 are extended coaxially under the engine 5 and the transmission case 6. The propeller shafts 11 and 12 are connected to the engine 5 through a power transmission mechanism including an output shaft and transmission gears held in the transmission case 6, and V-belt type variable-speed transmissions.

The front propeller shaft 11 is extended forward and is connected to an input shaft 22 held in a front reduction gear case 13. The rear propeller shaft 12 is extended rearward and is connected to an input gear shaft held in a rear reduction gear case 14. Joint shafts 25 projecting from the right and the left side of the front reduction gear case 13 are connected to right and left front axles 26 by ball joints. Rear axles 28 project from the right and the left side of the rear reduction gear case 14.

Figure 3:
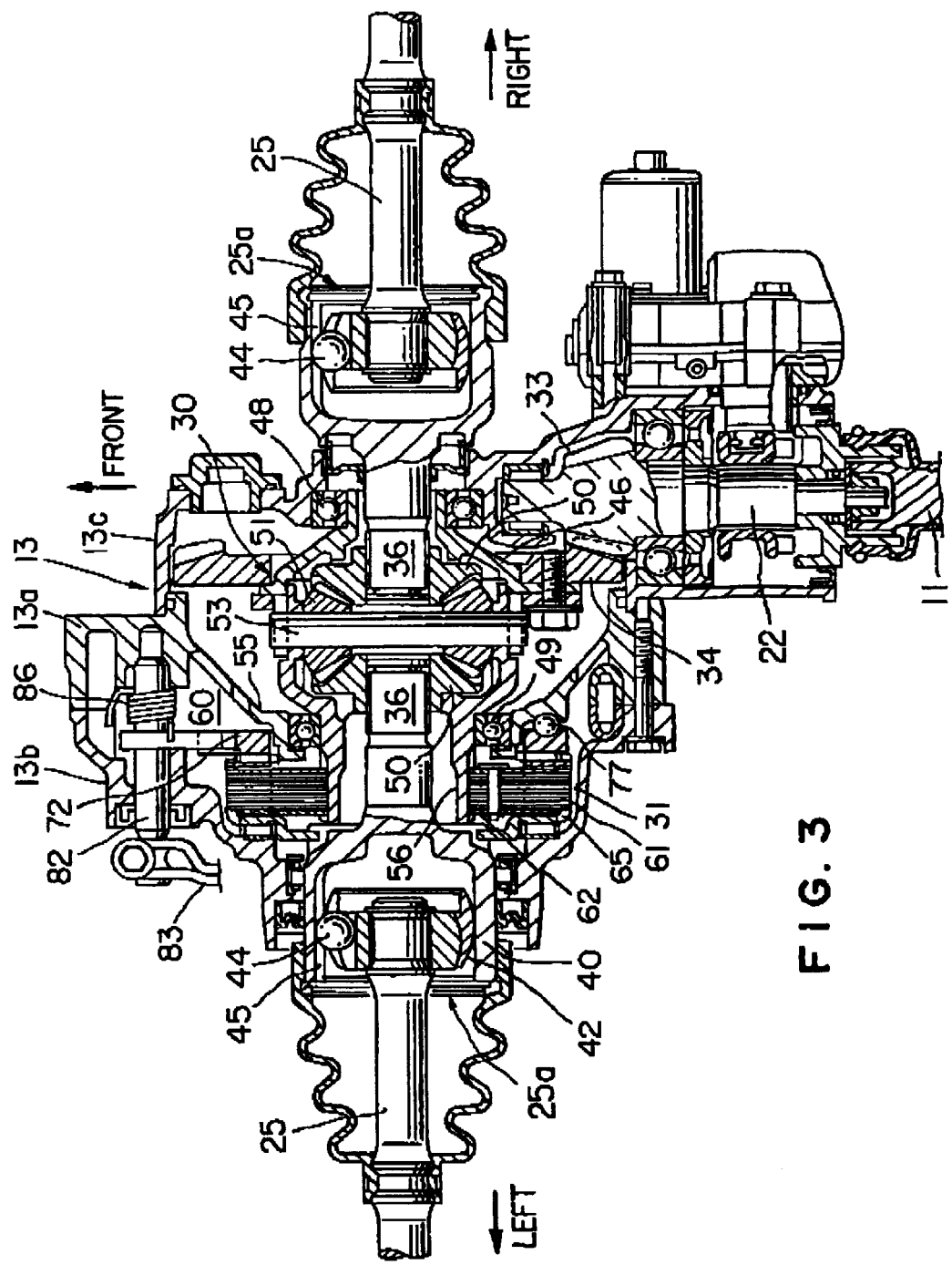
FIG. 3 is an enlarged longitudinal sectional view taken on a horizontal plane of a reduction gear for front wheels.

Referring to FIG. 3, the front reduction gear case 13 is a three-piece structure consisting of a middle case member 13a, a right case member 13c and a left case member 13b. A differential gear mechanism 30 is held in the reduction gear case 13. A wet multiple-disk differential limiting mechanism 31 is disposed on the left side of the differential gear mechanism 30 in the reduction gear case 13. A drive pinion 33 formed integrally with the input shaft 22 is disposed on the right side of the differential gear mechanism 30. The drive pinion 33 is engaged with a driven gear 34 fastened to a peripheral part of a differential case 46 of the differential gear mechanism 30. The right and the left joint shafts 25 are connected by joints 25a each including a steel ball 44 and a cylindrical socket 40 provided in its inside surface with a groove 45 to right and left differential gear shafts 36, respectively. The ball 44 is held on a ball holding part 42 formed on the inner end of each joint shaft 25 so as to engage in the groove 45. The outer end of each joint shaft 25 is connected to the front axle 26 by a joint 25a similar to that shown in FIG. 2.

Basically, the differential gear mechanism 30 shown in FIG. 3 is similar in basic construction to a generally known differential gear mechanism. The differential gear mechanism 30 includes the differential case 46, a pair of side gears 50 disposed in right and left regions, respectively, in the differential case 46, and a pair of differential pinions 51 having axes perpendicular to those of the side gears 50 and engaging the pair of side gears 50. The side gears 50 are mounted on and interlocked by splines with the right and left differential gear shafts 36, respectively. The differential pinions 51 are supported for rotation on a shaft 53 fixed to the differential case 46 with its axis extended perpendicularly to those of the differential gear shafts 36. A right end part of the differential case 46 is supported for rotation in a bearing 48 on the right case member 13c. A left end part of the differential case 46 is supported in a bearing 49 on a middle wall 55 formed integrally with the middle case member 13a. A hub 56 formed integrally with the left end part of the differential case 46 projects to the left from the middle wall 55. The hub 56 serves as a support member for supporting annular metal disks 62 included in the differential limiting mechanism 31.

Figure 5:
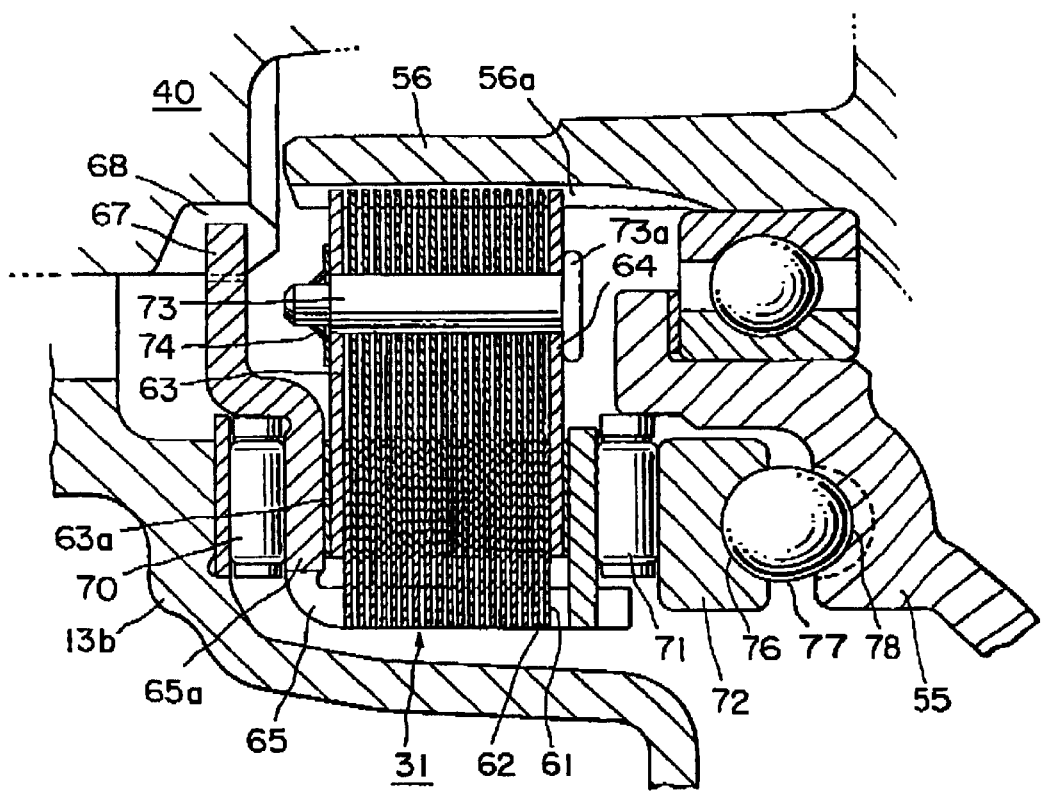
FIG. 5 is an enlarged view of a differential limiting mechanism included in the reduction gear shown in FIG. 3.

The construction of the wet multiple-disk differential limiting mechanism 31 will be described. A differential limiting mechanism holding chamber 60 is formed between the left case member 13b and the middle wall 55. The differential limiting mechanism holding chamber 60 communicates with the interior of the reduction gear case holding the differential case 46 therein. A predetermined quantity of lubricating oil is contained in the differential limiting mechanism holding chamber 60. Referring to FIG. 5, a plurality of annular friction disks 61 and the annular metal disks 62 are arranged alternately between a pair of annular pressure plates 63 and 64. Internal splines are formed in the inner circumferences of the annular metal disks 62, and external splines 56a are formed on the hub 56. The annular metal disks 62 are mounted on the hub 56 with the internal splines engaging the external splines 56a so as to be axially movable on the hub 56. The annular friction disks 61 are provided with teeth in their outer circumferences. The teeth of the annular friction disks 61 engages internal splines formed in a cylindrical housing 65. A left end wall 65a is formed integrally with the housing 65 and is provided with teeth 67 in its inner circumference. The teeth 67 of the end wall 65a engage teeth 68 formed in the outer circumference of the cylindrical socket 40. Thus the housing 65 rotates together with the cylindrical socket 40. The left end surface of the end wall 65a can be pressed through a needle bearing 70 against the inner side surface of the left case member 13b. The right end surface of the end wall 65a can be pressed against a friction member 63a bonded to the left surface of the left pressure plate 63.

Pins 73 each having a head 73a are extended axially through the pressure plates 63 and 64 and the metal disks 62. Snap rings 74 are put in annular grooves formed in free end parts of the pins 73. The heads 73a of the pins 73 and the snap rings 74 put on the pins 73 define a maximum interval between the pressure plates 63 and 64. The initial differential limiting torque can be reduced by increasing the interval between the pressure plates 63 and 64. The initial differential limiting torque can be reduced to zero when necessary. A cam ring 72 is pressed through a needle bearing 71 against the right surface of the right pressure plate 64. The cam ring 72 is provided in its right end surface with six cam grooves 76. The middle wall 55 is provided in its surface facing the cam ring 72 with six semispherical recesses 78 at positions corresponding to the cam grooves 76. Balls (steel balls) 77 are held for rotation in the recesses 78 and engage the cam grooves 76, respectively.

Figure 4:
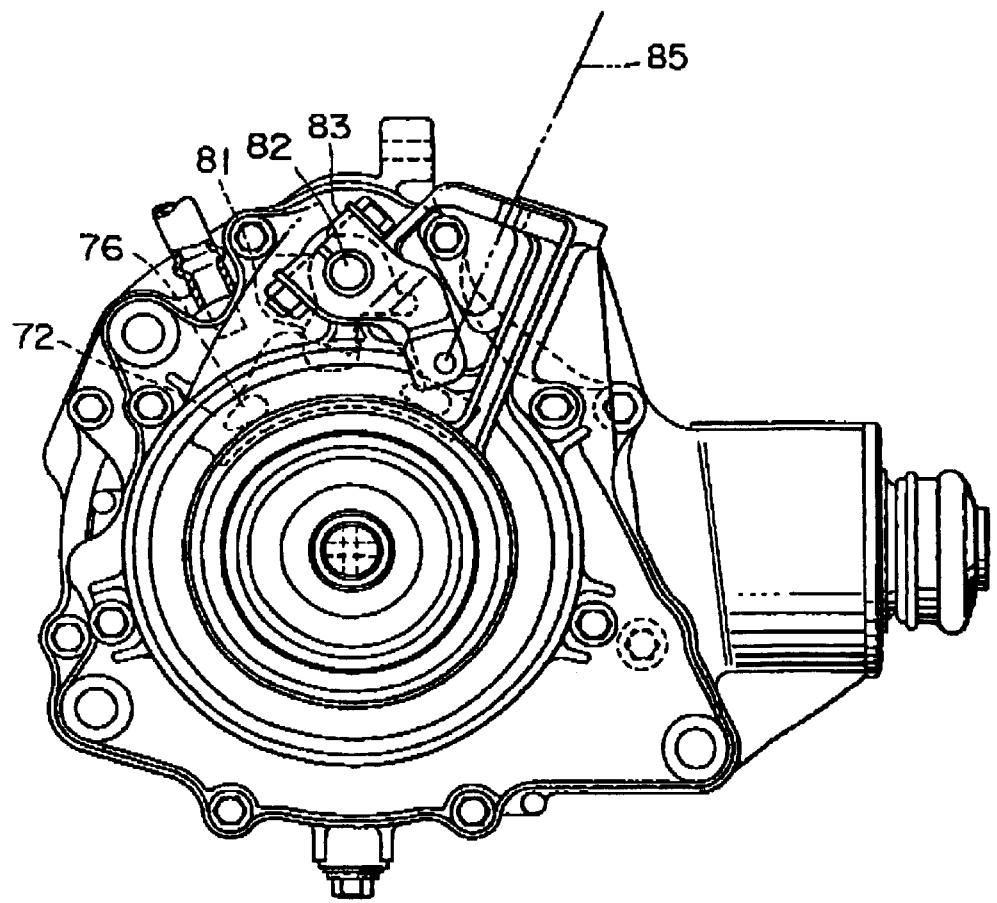
FIG. 4 is a left side elevation of the reduction gear shown in FIG. 3.
Figure 6:
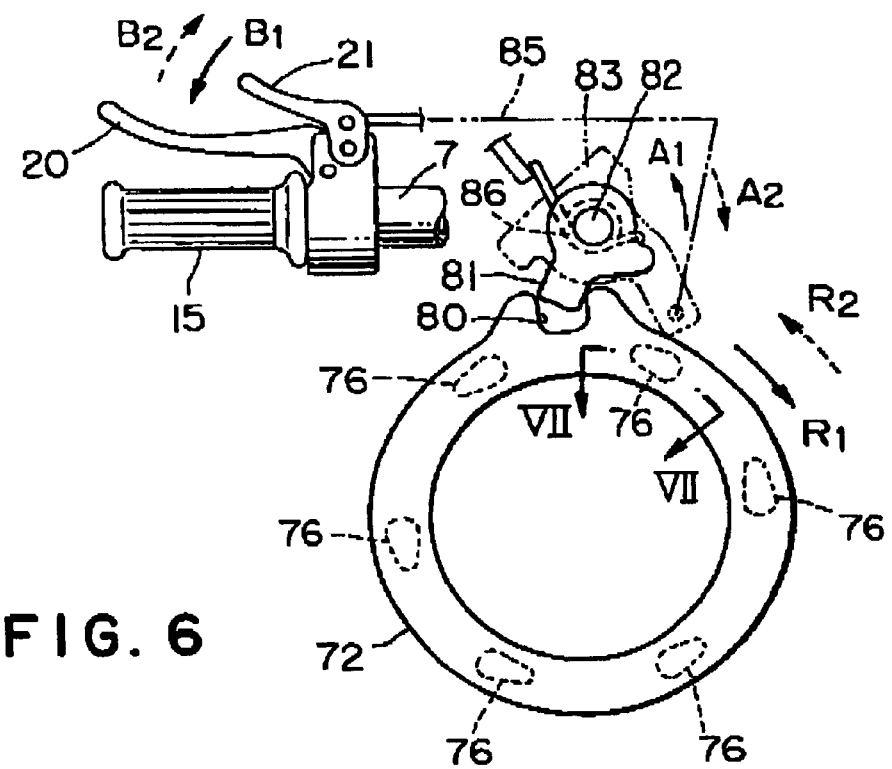
FIG. 6 is a left side elevation of a cam ring.
Figure 7:
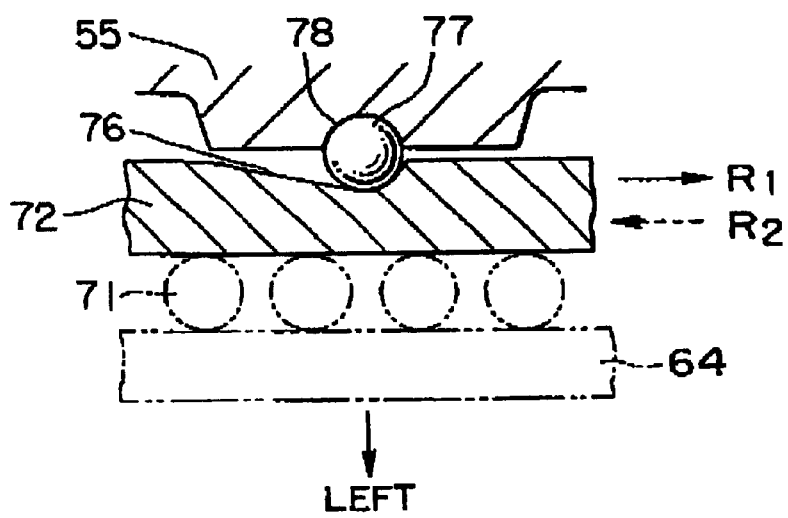
FIG. 7 is an enlarged sectional view taken con line VII—VII in FIG. 6.

Referring to FIGS. 6 and 7 showing the cam ring 72 in a side elevation and an enlarged sectional view, the differential limiting torque is increased by turning the cam ring 72 in the direction of the arrow R1 or is decreased by turning the cam ring 72 in the direction of the arrow R2. As shown in FIG. 7, the bottom of each cam groove 76 is sloped so that the depth of the cam groove 76 decreases gradually in the direction of the arrow R2. Thus, when the cam ring 72 is turned in the direction of the arrow R1 relative to the balls 77, the cam ring 72 is pressed by the balls 77 so as to push the right pressure plate 64 to the left through the needle bearing 71. As shown in FIG. 6, the six cam grooves 76 are formed at equal angular intervals in the cam ring 72. An interlocking recess 80 is formed in the outer circumference of the cam ring 72, and an operating lever 81 engages in the interlocking recess 80. The operating lever 81 is fixedly supported on one end part of a shaft 82 and is biased in the direction of the arrow A2, i.e., a direction to reduce the differential limiting torque, by a torsion coil spring 86. An external lever 83 is fixedly mounted on the other end part of the shaft 82. A wire cable 85 has one end connected to the external lever 83 and the other end connected to the differential limiting lever 21 disposed near the handgrip 15. When the differential limiting lever 21 is turned in the direction of the arrow B1, the external lever 83, the shaft 82 and the operating lever 81 are turned in the direction of the arrow A1. Consequently, the cam ring 72 is turned in the direction of the arrow R1, i.e., the direction to increase the differential limiting torque. Opposite end parts of the shaft 82 are supported for turning on the left case member 13b and the middle case member 13a as shown in FIG. 3. The shape of the external lever 83 can be exactly known from FIGS. 3 and 4.

The basic operation of the differential gear mechanism 30 is similar to a generally known differential operation. Referring to FIG. 3, the rotation of the front propeller shaft 11 is transmitted through the input shaft 22, the drive pinion 33 and the driven gear 34 to the differential case 46 of the differential gear mechanism 30. The rotation of the differential case 46 is transmitted through the shaft 53, the differential pinions 51 and the side gears 50 to the differential gear shafts 36 and the joint shafts 25. While the right and the left wheels 2 (FIG. 2) are substantially equally loaded, the right and the left wheel 2 rotates at the same rotating speed. When the difference between loads on the right and the left wheel 2 is large, which occurs when the vehicle travels along a curve, the differential pinions 51 rotate around the shaft 53 for a differential operation.

The operation of the differential limiting mechanism 31 will be described. Referring to FIG. 6, the operating lever 81 is biased in the direction of the arrow A2 by the torsion coil spring 86 and the differential limiting lever 21 is turned in the direction of the arrow B2 and is held in an inoperative state while the differential limiting lever 21 is in a free state. The cam ring 72 is turned in the direction of the arrow R2 and the balls 77 are in the deepest parts of the cam grooves 76. Consequently, the cam ring 72 is moved to the right and the pressure plate 64 is not pushed by the cam ring 72. Thus, the differential limiting mechanism 31 is in an initial differential limiting torque transmitting state, in which the metal disks 62 and the friction disks 61 are engaged by the viscosity of the oil to transmit a very low differential limiting torque. If the differential limiting mechanism 31 is set for an initial differential limiting torque of zero, any differential limiting torque is not transmitted at all in the initial differential limiting torque transmitting state.

When it is desired to produce a differential limiting torque, the differential limiting lever 21 is turned properly. Then, the cam ring 72 is turned in the direction of the arrow R1, i.e., the direction to increase differential limiting torque, through the wire cable 85, the external lever 83, the shaft 82 and the operating lever 81 to push the right pressure plate 64 to the left by the cam ring 72 by the cam action of the cam grooves 76 and the balls 77 to compress the friction disks 61 and the metal disks 62 between the pressure plates 63 and 64 shown in FIG. 5. Consequently, a differential limiting torque corresponding to the turning angle of the differential limiting lever 21 is produced.

When the differential limiting lever 21 is fully turned, a differential limiting torque substantially equal to that produced by the conventional dog clutch type differential locking device can be produced. When the differential limiting lever 21 is released, the differential limiting lever 21, the shaft 82 and the cam ring 72 are turned automatically in the directions of the arrows B2, A2 and R2, respectively, to reduce the differential limiting torque to the initial differential limiting torque. The initial differential limiting torque can be adjusted by adjusting the position of the snap rings 74 on the pins 73.

The present invention is applicable also to a rear differential gear mechanism. Although the differential limiting lever 21 is operated by hand to operate the cam ring 72 through the wire cable 85 for differential limiting torque adjustment in this embodiment, the differential limiting torque may be adjusted by means of an actuator or a hydraulic operating system. The present invention may be embodied by a wheel driving system including a dry multiple-disk differential limiting mechanism.

As apparent from the foregoing description, according to the present invention, the multiple-disk differential limiting mechanism 31 capable of transmitting variable differential limiting torque is interposed between the first rotating member, such as the differential case 46, on the input side of the differential gear mechanism 30 and the second rotating member, such as the differential gear shaft 36 of the differential gear mechanism 30, on the side of the wheel and the differential limiting torque can be adjusted by the differential limiting mechanism. Thus the differential limiting torque can be continuously and quickly varied while the vehicle is traveling, so that the differential performance of the differential and the operability of the vehicle are improved.

Since the friction disks 61 and the metal disks 62 of the wet multiple-disk differential limiting mechanism 31 are immersed in the oil, the viscosity of the oil can be used for producing the initial differential limiting torque; that is, the initial differential limiting torque can be easily determined.

The pressing cam ring 72 of the differential limiting mechanism operating mechanism is disposed for turning on one side of an arrangement of friction disks 61 of the multiple-disk differential limiting mechanism 31, and the pressing cam ring 72 can compress the friction disks 61,62 by the rotation of the pressing cam ring 72 through the cam mechanism having balls 77 and the cam grooves 76. Thus, the differential limiting mechanism operating mechanism can be compactly arranged in the reduction gear case 13.

The differential limiting lever 21 disposed near the handgrip 15 attached to the handlebar 7 enables the rider to adjust the differential limiting torque of the differential limiting mechanism 31 easily in an ordinary riding position. The differential limiting torque can be reduced to the initial differential limiting torque simply by releasing the differential limiting lever 21.

Since the differential limiting mechanism 31 is disposed opposite to the drive pinion 33 with respect to the driven gear 34 fastened to the differential case 46, the components of various mechanisms such as the differential gear mechanism 30, the multiple-disk differential limiting mechanism 31 and the differential limiting mechanism operating mechanism can be compactly arranged within the reduction gear case 13.

Although the invention has been described in its preferred embodiment with a certain degree of particularity, obviously many changes and variations are possible therein. It is therefore to be understood that the present invention may be practiced otherwise than as specifically described herein without departing from the scope and spirit thereof.

What is claimed is:

1. A wheel driving system for an all-terrain vehicle provided with a differential gear mechanism having a differential case and a driven gear fastened to the differential case, formed in a reduction gear case and connecting right and left wheels of the vehicle to a drive shaft connected to an engine, said wheel driving system comprising:

a multiple-disk differential limiting mechanism capable of transmitting differential limiting torque and of varying the differential limiting torque, interposed between a first rotating member on the input side of the differential gear mechanism and a second rotating member on the side of the wheel;

a differential limiting mechanism operating mechanism for operating the multiple-disk differential limiting mechanism to vary the differential limiting torque;

wherein said first rotating member on the input side of the differential gear mechanism is the differential case and the second rotating member on the side of the wheel is a differential gear shall of the differential gear mechanism;

a hub formed integrally with an end part of the differential case and rotatable together with the differential case, external splines being formed on an outer circumference of the hub;

a cylindrical housing connected to the differential gear shaft and rotatable together with the differential gear shaft, internal splines being formed on an inner circumference of the cylindrical housing, the internal splines positioned radially outward from the external splines of the hub; and wherein the clutch plates of the multiple-disk differential limiting mechanism are arranged between the hub and the cylindrical housing.

2. The wheel driving system according to claim 1, wherein the multiple-disk differential limiting mechanism is a wet multiple-disk differential limiting mechanism.

3. The wheel driving system according to claim 1, wherein the differential limiting mechanism operating mechanism includes a rotatable pressing cam ring disposed on one side of an arrangement of friction disks of the multiple-disk differential limiting mechanism and a cam mechanism capable of being made to compress the friction disks by a rotation of the pressing cam ring.

4. The wheel driving system according to claim 1, wherein the differential limiting mechanism operating mechanism is controlled by operating an operating lever disposed near a handgrip attached to a handlebar of the all-terrain vehicle.

5. The wheel driving system according to claim 1, wherein the driven gear fastened to the differential case is engaged with a drive pinion and the drive pinion is provided on an input shaft of the differential gear mechanism, and wherein the multiple-disk differential limiting mechanism is disposed opposite to the drive pinion with respect to the driven gear.

6. The wheel driving system according to claim 1, wherein the clutch plates of the multiple-disk differential limiting mechanism have a plurality of annular friction disks and annular metal disks arranged alternatively, internal splines are formed on an inner circumference of the annular metal disks, the annular metal disks are mounted on the hub with the internal splines of the annular metal disks engaging the external splines of the hub, and teeth are formed on an outer circumference of the annular friction disks, the teeth of the annular friction disks engage the internal splines of the cylindrical housing.

7. The wheel driving system according to claim 3, wherein the rotatable pressing cam ring is disposed on a side of an arrangement of friction disks of the multiple-disk differential limiting mechanism facing toward a center part of the differential case.

8. The wheel driving system according to claim 5, wherein the multiple-disk differential limiting mechanism is disposed against one side of the differential case and an axis of the input shaft is disposed against an opposite side of the differential case, and the differential case is disposed between the multiple-disk differential limiting mechanism and the input shaft.

* * * * *